(12) United States Patent
Kelsey (10) Patent No.: US 6,330,676 B1
(45) Date of Patent: Dec. 11, 2001

(54) METHOD AND SYSTEM FOR THE AUTOMATIC INITIATION OF POWER APPLICATION AND START-UP ACTIVITIES IN A COMPUTER SYSTEM

(75) Inventor: Todd Kelsey, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/149,526

(22) Filed: Sep. 8, 1998

(51) Int. Cl.[7] .......................... G06F 11/30; G06F 9/445; H04L 9/32
(52) U.S. Cl. .......................... 713/200; 714/36; 713/2
(58) Field of Search .......................... 713/1, 2, 200, 713/201, 202; 340/825.36, 825.34, 517, 522, 5.1, 5.2, 5.8, 5.81, 5.82, 5.83, 5.84, 5.85; 348/156; 714/36

(56) References Cited

U.S. PATENT DOCUMENTS

| | | | |
|---|---|---|---|
| 4,978,946 | * 12/1990 | Nordholm et al. | 340/573.1 |
| 5,305,197 | 4/1994 | Axler et al. | 364/401 |
| 5,377,269 | 12/1994 | Heptig et al. | 380/25 |
| 5,396,443 | 3/1995 | Mese et al. | 364/707 |
| 5,408,668 | 4/1995 | Tornai | 395/750 |
| 5,504,675 | 4/1996 | Cragun et al. | 364/401 |
| 5,548,660 | 8/1996 | Lemelson | 382/116 |
| 5,615,277 | 3/1997 | Hoffman | 382/115 |
| 5,666,541 | 9/1997 | Sellers | 395/750.06 |
| 5,669,004 | 9/1997 | Sellers | 395/750.06 |
| 5,675,810 | 10/1997 | Sellers | 395/750 |
| 6,002,427 | * 12/1999 | Kipust et al. | 340/571 |
| 6,111,517 | * 8/2000 | Atick et al. | 340/5.83 |

OTHER PUBLICATIONS

"Women on the Verge of New Technology—Further Events", http://www.imago.com.au/WOV/events.htm.
T. G. Zimmerman et al., "Applying Electric Field Sensing to Human–Computer Interfaces," http://www.acm.org.turing/sigs/sigc . . . ctronic/documnts/papers/tgz_bdy.htm.
IBM Technical Dislcosure Bulletin, "Personal Computer Environmental Control Via a Proximity Sensor," vol. 36, No. 08, Aug. 1993, pp. 343–345.

* cited by examiner

Primary Examiner—Gail Hayes
Assistant Examiner—Christopher A. Revak
(74) Attorney, Agent, or Firm—Bracewell & Patterson LLP.

(57) ABSTRACT

A method and system for automatically initiating particular computer system activities in a computer system. Initially, a predetermined list of computer system activities to be initiated is stored within the computer system. Thereafter, the presence of a user within a particular area surrounding the computer system is detected. Next, particular amount of time that has passed since the computer system activities were last processed is determined. The computer system activities contained within the predetermined list of computer system activities are then automatically initiated, in response to detecting the presence of a user within the particular area, if the particular amount of time that has passed since the computer system activities were last processed is greater than a predetermined threshold period, thereby permitting the computer system activities to be initiated without manual user input. The computer system itself may be implemented as a computer workstation or stand-alone personal computer within a distributed computer network. In this case, the predetermined list of computer system activities to be initiated can be stored at a memory location (e.g., memory location at a server or host) within the distributed computer network.

28 Claims, 4 Drawing Sheets

METHOD AND SYSTEM FOR THE AUTOMATIC INITIATION OF POWER APPLICATION AND START-UP ACTIVITIES IN A COMPUTER SYSTEM

BACKGROUND OF THE INVENTION

1. Technical Field

The present invention relates in general to data-processing systems. In particular, the present invention relates to methods and systems for detecting the presence of users in the vicinity of a data-processing system. More particularly, the present invention relates to methods and systems for identifying particular users. Still more particularly, the present invention relates to methods and systems for automatically initiating particular activities within a data-processing system, such as a computer system.

2. Description of the Related Art

A typical computer system comes equipped with a central processing unit (CPU), a memory, a keyboard, and various peripherals, such as a display monitor and a printer. In normal usage, it is common for computer peripherals to be turned off or temporarily paused until a user manually initiates processing of particular system activities, such as powering on the computer or activating particular computer applications. In particular, network-based computers that boot themselves from a host computer are often faced with a lengthy "boot" or "power-up" period. A user must manually press a power "on" switch connected to the computer and wait while the system powers up. This procedure is often referred to as a "cold boot," and requires manual activity on the part of the user, which often prevents the user from focusing efforts on other, more important tasks. In addition, upon "power up" particular activities are routinely performed, which may be of use to some individual users but of no interest to other users.

Based on the foregoing, it can be appreciated that a need exists for a method and system which would automatically boot computers in response to the detection of the presence of a user in an area near the computer. A need also exists for a method and system for configuring and customizing the automatic initiation of particular computer system activities in order so save on start-up time and free users to focus on other tasks. Currently, however, there are no devices believed to be available which automatically and satisfactorily accomplish this purpose.

SUMMARY OF THE INVENTION

It is therefore one object of the present invention to provide an improved data-processing system.

It is therefore another object of the present invention to provide a method and system for detecting the presence of users within the vicinity of a data-processing system.

It is yet another object of the present invention to provide an improved method and system for identifying particular users.

It is still another object of the present invention to provide an improved method and system for automatically initiating particular activities within a data-processing system, such as a computer system.

The above and other objects are achieved as is now described. A method and system for automatically initiating power application and particular computer system activities in a computer system. Initially, a predetermined list of computer system activities to be initiated is stored within the computer system. Thereafter, the presence of a user within a particular area surrounding the computer system is detected. Next, a particular amount of time that has passed since the computer system activities were last processed is determined. The computer system activities contained within the predetermined list of computer system activities are then automatically initiated, in response to detecting the presence of a user within the particular area, if the particular amount of time that has passed since the computer system activities were last processed is greater than a predetermined threshold period, thereby permitting power application and selected computer system activities to be initiated without manual user input. The computer system itself may be implemented as a computer workstation or stand-alone personal computer within a distributed computer network. In this case, the predetermined list of computer system activities to be initiated can be stored at a memory location (e.g., memory location at a server or host) within the distributed computer network.

BRIEF DESCRIPTION OF THE DRAWINGS

The novel features believed characteristic of this invention are set forth in the appended claims. The invention itself, however, as well as a preferred mode of use, further objects, and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
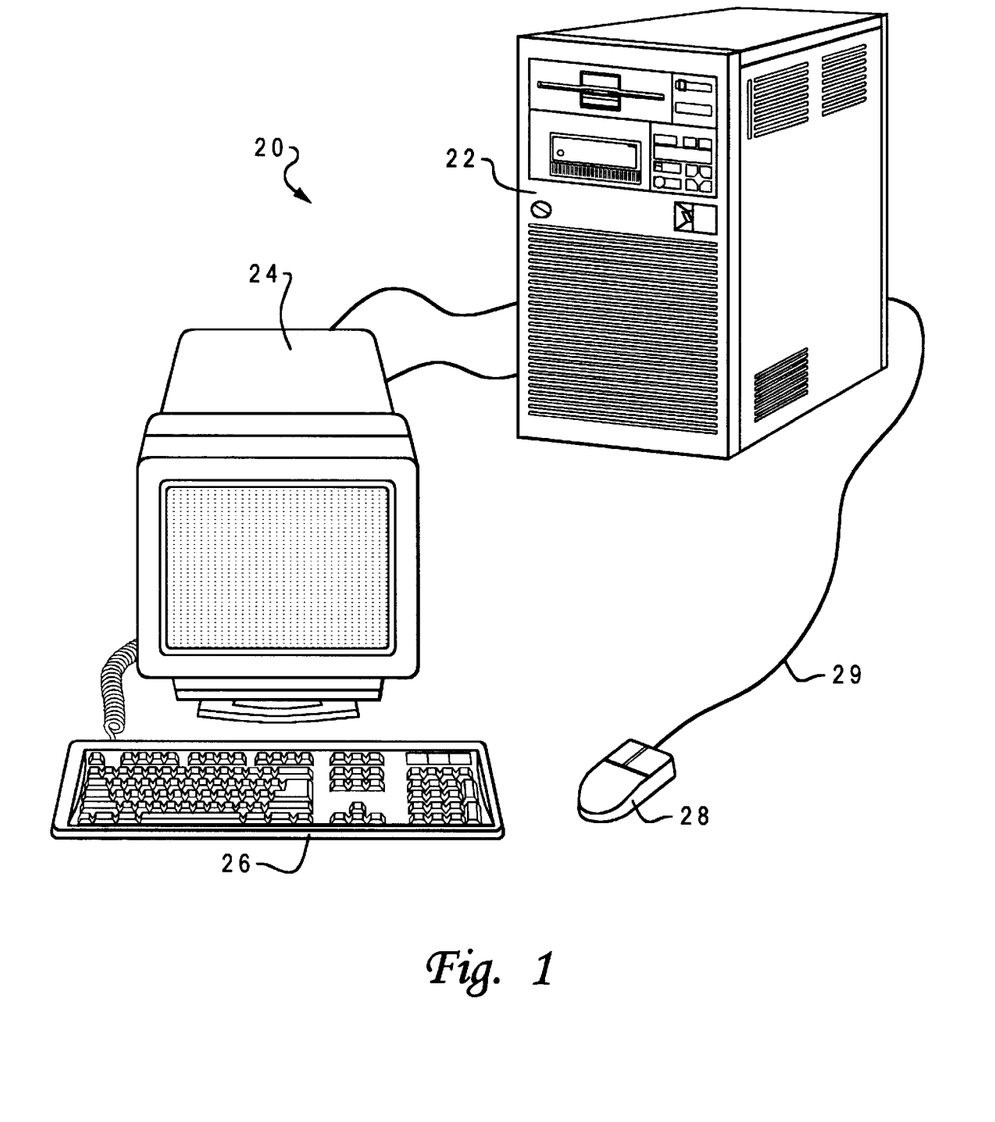
FIG. 1 illustrates a pictorial representation of a computer system in accordance with a preferred embodiment of the present invention.

With reference now to the figures and in particular with reference to FIG. 1, there is depicted a pictorial representation of a computer system in accordance with a preferred embodiment of the present invention. A computer system 20 is depicted that includes a system unit 22, a video display 24, a keyboard 26, and a mouse 28. Computer system 20 can be implemented utilizing any suitable computer such as the AS/400 computer system, IBM SYSTEM RISC/6000, or a personal computer. The AS/400 computer system and the IBM SYSTEM RISC/6000 are products of International Business Machines Corporation, located in Armonk, N.Y. Although the depicted embodiment involves a personal computer, a preferred embodiment of the present invention can be implemented in other types of data-processing systems, such as, for example, intelligent workstations, mini-computers, or "notebook" computers such as the configuration depicted in FIG. 1 herein.

Those skilled in the art will also appreciate that computer system 20 may also be implemented as a "laptop" or "notebook" computer, well known in the computer arts. In addition, computer system 20 may be implemented in the context of a so-called Personal Digital Assistant (PDA), a lightweight palm-top computer designed to provide particular functions, such as personal organization (e.g., calendar, note-taking, database, calculator, and so forth) as well as communications, including infrared and direct wire-line network communications. Computer system 20 also includes a graphical user interface that resides within a machine-readable media to direct the operation of computer system 20. Those skilled in the art will appreciate that the method and system of the present invention apply equally to any computer system, regardless of whether the computer system is a complicated multi-user computing apparatus or a single-user workstation.

Keyboard 26 is that part of computer system 20 that resembles a typewriter keyboard and which enables a user to control particular aspects of the computer. Because information flows in one direction, from keyboard 26 to system unit 22, keyboard 26 functions as an input-only device. Functionally, keyboard 26 represents half of a complete input/output device, the output half being video display 24. Keyboard 26 includes a standard set of printable characters presented in a QWERTY pattern typical of most typewriters. In addition, keyboard 26 may include a calculator-like numeric keypad at one side and additional specialized keys. Some of these keys, such as the "Control," "Alt," and "Shift" keys may be utilized to change the meaning of another key. Other special keys and combinations of keys can be utilized to control program operations or to move either text or cursor on the display screen of video display 24.

Mouse 28 is a commonly utilized pointing device. The basic features of a typical mouse include a casing with a flat bottom that is designed to be gripped by one human hand. A typical mouse also includes one or more buttons located atop the mouse, and a multidirectional detection device (e.g., usually a ball) located on the bottom of the mouse. A cable 29 connects mouse 28 to a computer such as computer system 20. By moving mouse 28 on a surface (e.g, a desk surface or a mouse pad), the user typically controls an on-screen cursor. Such a mouse is a relative pointing device, because the mouse's movement is not defined by limitations, and also because its placement on a surface does not map directly to a specific location on a computer screen. Generally, to select items or choose commands on a screen displayed graphical user interface, the user presses one or more mouse buttons, producing a so-called mouse "click."

The mouse can be utilized to manipulate a mouse pointer which is an on-screen element whose location changes as the user moves the mouse. Depending on the location of the mouse pointer and the operation of the program with which it is working, the area of the screen where the mouse pointer appears serves as the target for an action when the user presses one of the mouse buttons. Although mouse 28 is described as a pointing device which may be utilized in accordance with a preferred embodiment of the present invention, those skilled in the art will appreciate that other pointing devices can also be utilized in association with a preferred embodiment of the present invention. One type of pointing device that may be utilized in association with a preferred embodiment is the IBM TrackPoint II™. Thus, mouse 28 is not a necessary feature of the present invention, but is presented for illustrative purposes only.

Figure 2:
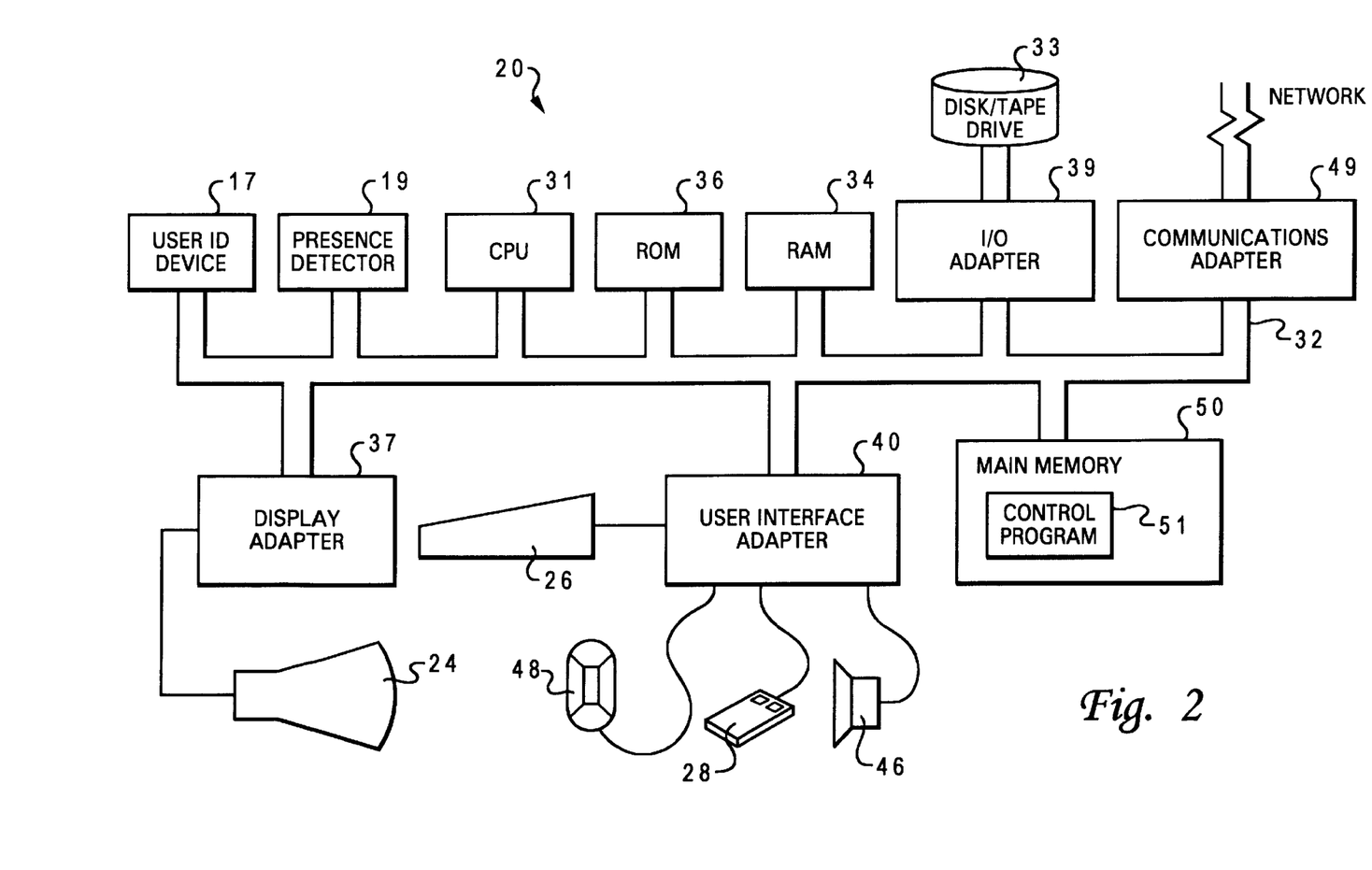
FIG. 2 depicts a representative hardware environment of a computer system in accordance with the preferred embodiment of the present invention.

FIG. 2 depicts a representative hardware environment of the computer system illustrated in FIG. 1, in accordance with a preferred embodiment of the present invention. In FIG. 1 and FIG. 2, like parts are indicated by like reference numbers. Thus, system unit 22 of FIG. 1 includes a Central Processing Unit ("CPU") 31, such as a conventional microprocessor, and a number of other processing and execution units interconnected via system bus 32. Computer system 20 includes random-access memory ("RAM") 34, read-only memory ("ROM") 36, display adapter 37 for connecting system bus 32 to video display 24, and I/O adapter 39 for connecting peripheral devices such as disk and tape drives 33 to system bus 32. Disk and tape drives 33 are electromechanical devices that read from and write to disks. The main components of a disk drive include a spindle on which the disk is mounted, a drive motor that spins the disk when the drive is in operation, one or more read/write heads that perform the actual reading and writing, a second motor that positions the read/write heads over the disk, and controller circuitry that synchronizes read/write activities and transfers information to and from computer system 20. A disk itself is typically a round, flat piece of flexible plastic (e.g., floppy disk) or inflexible metal (e.g. hard disk) coated with a magnetic material that can be electrically influenced to hold information recorded in digital (i.e., binary) form. A disk is, in most computers, the primary method for storing data on a permanent or semipermanent basis.

Because the magnetic coating of the disk must be protected from damage and contamination, a floppy (e.g., 5.25 inch) disk or micro-floppy (e.g., 3.5 inch) disk is encased in a protective plastic jacket. A hard disk, which is very finely machined, is typically enclosed in a rigid case and can be exposed only in a dust free environment.

Video display 24 is the visual output of computer system 20. Video display 24 can be, for example, a CRT-based video display well-known in the art of computer hardware. "CRT" is an acronym for cathode-ray tube. With a portable or notebook-based computer, video display 24 can be replaced with an LCD-based or a gas plasma-based flat-panel display. "LCD" is an acronym for liquid crystal display. Computer system 20 further includes user interface adapter 40 for connecting keyboard 26, mouse 28, speaker 46, microphone 48, and/or other user interface devices, such as a touch screen device (not shown), to system bus 32. Communications adapter 49 connects computer system 20 to a computer network. Although computer system 20 is shown to contain only a single CPU and a single system bus, it should be understood that the present invention applies equally to computer systems that posses multiple CPUs and to computer systems that include multiple buses that each perform different functions in different ways.

Computer system 20 also includes a graphical user interface that resides within a machine-readable media to assist a user in directing the operation of computer system 20. Any suitable machine-readable media may retain the graphical user interface, such as RAM 34, ROM 36, a magnetic diskette, magnetic tape, or optical disk (the last three being located in disk and tape drives 33). Any suitable operating system and associated graphical user interface (e.g., Microsoft Windows) may direct CPU 31. For example, the AIX operating system and AIX windows windowing system (i.e., graphical user interface) can direct CPU 31. The AIX operating system is IBM's implementation of the UNIX operating system. UNIX is a trademark of UNIX Systems Laboratories, Inc. Other technologies can also be utilized in association with CPU 31, such as touch-screen technology or human voice control. Those skilled in the art will appreciate that the hardware depicted in FIG. 2 may vary for specific applications. For example, other peripheral devices such as optical disk media, audio adapters, or chip-programming devices, such as PAL or EPROM programming devices well-known in the art of computer hardware, and the like may be utilized in addition to or in place of the hardware already depicted.

Computer system 20 additionally includes a presence detector 19 which detects the presence of a user within a particular area or vicinity surrounding computer system 20. One example of a presence detector that may be utilized in association with a preferred embodiment of the present invention is a proximity sensor. There are several possible locations for a proximity sensor within computer system 20. For example, the proximity sensor may be built into system unit 22, facing in the same direction as video display 24, because a user utilizing computer system 22 would be more or less facing video display 24. Such a proximity sensor may also be mounted at the front of keyboard 26 or mouse 28, or a combination thereof. Those skilled in the art can appreciate that proximity sensors can be utilized in several locations on computer system 20 for better reliability. The proximity sensor itself can be based on active ultrasonic or infrared distance sensors, as is utilized on auto-focus cameras, or can be composed of a passive infraredphoto-transistor to search out objects with a body temperature nominally at 98.6° F. The output of the proximity sensor is converted to a logic signal which can then be monitored via system hardware or software, or a combination thereof. The proximity sensor need not be continuously sampled. If the proximity sensor were, for example, sampled at 5 Hz, this would be adequate for sensing the position of the user. A sampling rate of 0.1 Hz, for example, would be adequate for sensing the presence of a user. The output of the proximity sensor can be monitored via an ADC (Analog-to-Digital) card and a computer system thread or periodic low level query. Examples of presence detectors that may be implemented in accordance with a preferred embodiment of the present invention include the Optex AX-70T, Optex TN-2, and the Ostech Active Infrared Presence Sensor DK-12. A user identification device 17 may also be implemented in accordance with a presence detector and the configuration illustrated in FIG. 2. The user identification device 17 is utilized to identify a particular user. If presence detector 19 detects the presence of a user in a particular area surrounding the computer, then user identification device 17 can be included, in accordance with a preferred embodiment of the present invention, as a device which promotes an additional hurdle that must be overcome in order for particular system activities to be initiated. User identification device 17 can, for example, be implemented as a voice recognition device in order to identify a particular user.

Main memory 50 is connected to system bus 32, and includes a control program 51 that resides within main memory 50 and contains instructions that when executed on CPU 31, carry out the operations depicted in the logic flow chart described herein. The computer program product can also be referred to as a program product. It is important that, while the present invention has been (and will continue to be) described in the context of a fully functional computer system, those skilled in the art will appreciate that the present invention is capable of being distributed as a program product in a variety of forms, and that the present invention applies equally regardless of the particular type of signal-bearing media utilized to actually carry out the distribution.

Examples of signal-bearing media include: recordable-type media, such as floppy disks, hard disk drives and CD ROMs, and transmission-type media such as digital and analog communication links. Examples of transmission-type media include devices such as modems. A modem is a type of communications device that enables a computer to transmit information over a standard telephone line. Because a computer is digital (i.e., works with discrete electrical signals representative of binary 1 and binary 0) and a telephone line is analog (i.e., carries a signal that can have any of a large number of variations), modems can be utilized to convert digital to analog and vice-versa. The term "media" as utilized herein is a collective word for the physical material such as paper, disk, CD-ROM, tape and so forth, utilized for storing computer-based information.

Figure 3:
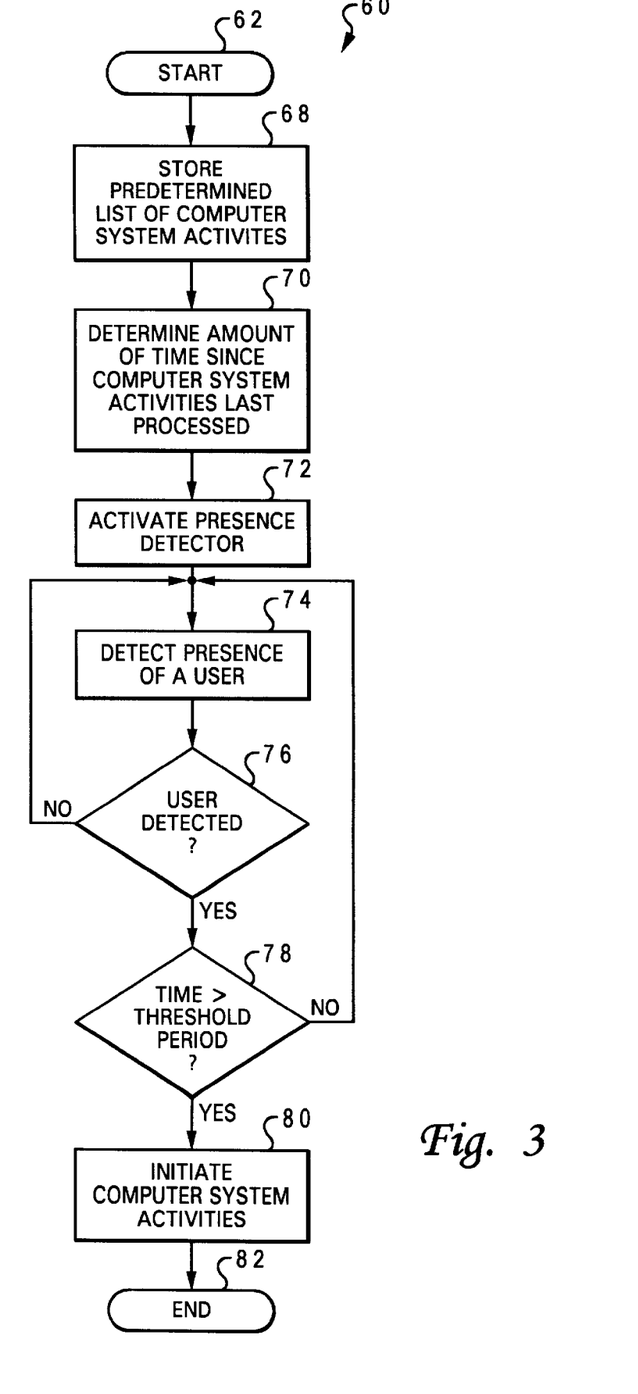
FIG. 3 is a flow diagram that shows steps utilized to carry out the method and system of the present invention, according to a preferred embodiment of the present
Figure 4:
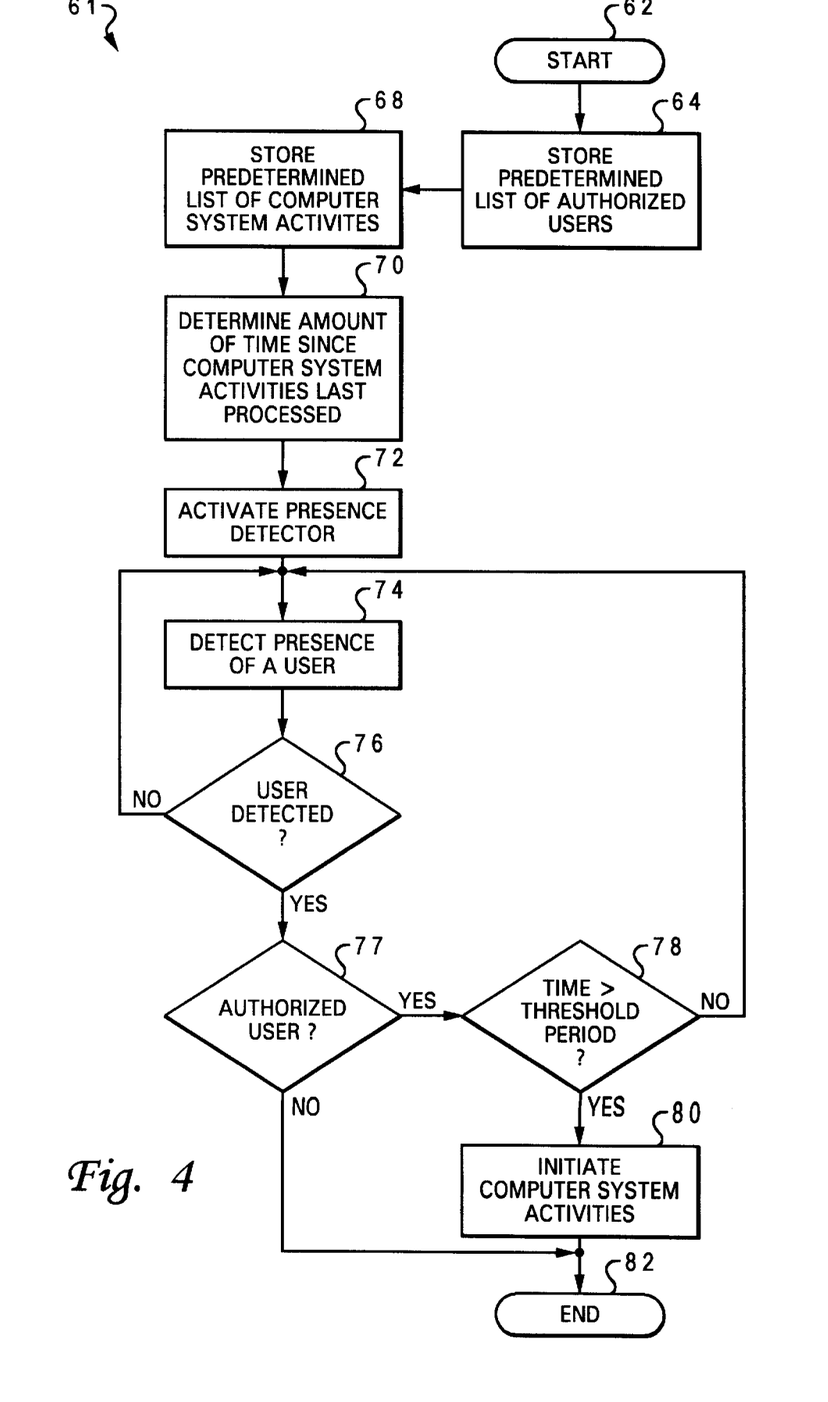
FIG. 4 is a flow diagram that shows steps utilized to carry out the method and system of the present invention, according to an alternative preferred embodiment of the present invention.

FIG. 3 is a flow diagram 60 that shows steps utilized to carry out the method and system of the present invention, according to a preferred embodiment of the present invention. Note that in FIG. 3 and FIG. 4, illustrated and described herein, like parts and operations are indicated by like reference numerals. It can be appreciated by those skilled in the art that FIG. 3 and FIG. 4 present a self-consistent sequence of steps leading to a desired result. The steps are those requiring physical manipulation of physical quantities. Usually, although not necessarily, these quantities take the form of electrical or magnetic signals capable of being stored, transferred, combined, compared, and otherwise manipulated. It has proven convenient at times by those skilled in the art, to refer to these signals as bits, values, elements, symbols, characters, terms, numbers, or the like. It should be borne in mind, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary or desirable in most cases in any of the operations described herein which form part of the present invention; the operations are machine operations. Useful machines for performing operations of a preferred embodiment of the present invention include data-processing systems such as general purpose digital computers or other similar devices. In all cases the distinction between the method operations in operating a computer and the method of computation itself should be borne in mind. The present invention relates to method steps for operating a computer, such as computer system 20 depicted in FIG. 1 and FIG. 2, in processing electrical or other (e.g. mechanical, chemical) physical signals to generate other desired physical signals.

Thus, as indicated at block 62, the process is initiated. As described at block 68, a predetermined list of computer system activities are stored within a memory location within a computer system, such as computer system 20 depicted in FIG. 1 and FIG. 2. Computer system activities can include activities such as powering on the computer system, running a system self-test, and so forth. As illustrated thereafter at block 70, a determination is performed regarding the amount of time that has passed since the computer system activities were last processed. This determination is performed in order to prevent the computer system, according to the process described herein, from accidentally, for example, powering on the computer system, if a user turned off the computer system manually and returned shortly thereafter to the area or office in which the computer system is located. In such a case, the user might not actually desire to power up the computer system. As indicated thereafter at block 72, the presence detector (e.g., see presence detector 19 depicted in FIG. 2) is activated.

As described next at block 74, the presence of a user is detected. Verification that a user has been detected is provided, as illustrated at block 76. According to the operation described at block 76, a test is performed to verify whether or not a user has been detected within a particular area surrounding the computer system. If a user has not been detected, then the operations described, beginning at block 74, are repeated. If a user is detected within the particular area surrounding the computer system, then an additional is performed as indicated at block 78, which is directly related to the operation described at block 70. As indicated at block 78, a test is performed to determine whether the amount of time that has passed since the computer system activities were last processed is greater than a predetermined threshold period. If the amount of time that has passed since the computer system activities were last processed is greater than the predetermined threshold period, the process continues, as indicated at block 80. However, if the amount of time that has passed since the computer system activities were last processed is less than the predetermined threshold period, the operations processed, beginning at block 74 are repeated, until the threshold period is reached.

For example, if a threshold period of thirty minutes is designated, a time period of twenty-five minutes from the last processing of the computer system activities results in a repeat of the operations described, beginning at block 74. Thus, if a user is detected in the vicinity of the computer system, and a proper amount of time has passed since the computer system activities were last processed, the computer system activities are subsequently processed, as illustrated at block 80. The process then terminates, as depicted at block 82. Those skilled in the art will, of course, appreciate that the process described herein can be modified to account for one particular computer system activity. For example, instead of designated and storing a predetermined list of computer system activities, one computer system activity, such as, for example, only powering on the computer system, can be initiated, according to a preferred embodiment of the present invention.

FIG. 4 is a flow diagram 61 that shows steps utilized to carry out the method and system of the present invention, according to an alternative preferred embodiment of the present invention. As indicated at block 62, the process is initiated. As illustrated at block 64, a predetermined list of authorized users is stored within a memory location with the computer system (e.g., computer system 20). As indicated thereafter at block 68, a predetermined list of computer system activities are also stored within the computer system. As illustrated thereafter at block 70, a determination is performed regarding the amount of time that has passed since the computer system activities were last processed. This determination is performed in order to prevent the computer system, according to the process described herein, from accidentally, for example, powering on the computer system, if a user turned off the computer system manually and returned shortly thereafter to the area or office in which the computer system is located. In such a case, the user might not actually desire to power up the computer system. As indicated thereafter at block 72, the presence detector (e.g., see presence detector 19 depicted in FIG. 2) is activated.

As described next at block 74, the presence of a user is detected. Verification that a user has been detected is provided, as illustrated at block 76. According to the operation described at block 76, a test is performed to verify whether or not a user has been detected within a particular area surrounding the computer system. If a user has not been detected, then the operations described, beginning at block 74, are repeated. If, however, a user is detected within the particular area surrounding the computer system, then an additional is performed as indicated at block 77 to determine whether, in fact, the user detected is an authorized user.

Various devices can be utilized to determine whether or not an individual user is an authorized user. For example, a voice recognition device which matches speech patterns associated with the list of predetermined authorized users stored in memory is one technique that can be implemented in accordance with an alternative preferred embodiment of the present invention. Thus, the operation described at block 77 is related to the operation indicated at block 64. As illustrated at block 77, if the detected user is a user included amount the list of authorized users stored within the computer system, then the operations continue. However, if not, then the process terminates, as illustrated at block 82. Assuming that the user is an authorized user, then as depicted thereafter at block 78, a test is performed to determine whether the amount of time that has passed since the computer system activities were last processed is greater than a predetermined threshold period. If the amount of time that has passed since the computer system activities were last processed is greater than the predetermined threshold period, the process continues, as indicated at block 80. However, if the amount of time that has passed since the computer system activities were last processed is less than the predetermined threshold period, the operations processed, beginning at block 74 are repeated, until the threshold period is reached. Thus, according to the flow of operations described and illustrated in FIG. 4, if an authorized user is detected in the vicinity of the computer system, and a proper amount of time has passed since the computer system activities were last processed, computer system activities are subsequently initiated, as illustrated at block 80. The process then terminates, as depicted at block 82.

Although the foregoing description relates to a computer system, such as computer system 20 depicted in FIG. 1 and FIG. 2, those skilled in the art can appreciate that the present invention can be implemented within a distributed computer network. As distributed objects and programs (e.g., Java Enterprise Beans) become increasingly popular, jobs and programs are spread across increasingly larger computer networks. Thus, the benefit of identifying whether a user is present, as described and explained herein, is a usefull tool in a distributed computer network environment, because jobs can be either reprioritized or moved to other computer workstations that do not necessarily have a user present (i.e., "user present" means that some of the CPU is required for interactive work). In addition, computer network workstations are currently being promoted because of the ability to permit "roaming" users, which means that a user can move from PC to PC and obtain the same desktop operating environment following computer power-up.

A benefit resulting from a practical implementation of the present invention in the context of a computer network environment derives from the fact that if a particular computer workstation operating within the distributed computer network fails, a new generic desktop can be brought up at any other computer workstation, because the generic desktop is downloaded automatically when the computer is powered-up. Over time, such generic desktops are likely to be customized (e.g., accounting department, programmer, etc). By implementing the present invention in the context of such desktops, the presence of a user can be detected in order to automatically download a more customized desktop versus the generic "one size fits all" desktops currently in use. Although the present invention has been discussed herein in the context of personal computers, network computers, and similar, devices, those skilled in the art can also appreciate that the present invention may also be implemented and practiced in the context of pervasive computer devices. For example, the present invention may be implemented within a car system that adjusts seat positions or radio preselections. The present invention may also be implemented in television set-top boxes that limit available channels based on user identification via sensor. Thus, those skilled in the art will appreciate that a wide range of options for practicing the present invention described herein are available.

The embodiments and examples set forth herein are presented in order to best explain the present invention and its practical application and to thereby enable those skilled in the art to make and use the invention. However, those skilled in the art will recognize that the foregoing description and examples have been presented for the purposes of illustration and example only. For example, those skilled in the art can appreciate that the present invention can be implemented for utilization with computer workstations within a distributed computer network. From the foregoing, those skilled in the art can appreciate that the description as set forth is not intended to be exhaustive or to limit the invention to the precise form disclosed. Many modifications and variations are possible in light of the above teaching without departing from the spirit and scope of the following claims.

What is claimed is:

1. A method in a computer system for automatically initiating particular computer system activities, said method comprising the steps of:
    storing within said computer system, a predetermined list of computer system activities to be initiated, said predetermined list of computer system activities including an initiation of a system self-test;
    detecting the presence of a user within a particular area surrounding said computer system;
    determining a particular amount of time that has passed since said computer system activities were last processed; and
    automatically powering up said computer system and initiating said computer system activities contained within said predetermined list of computer system activities, in response to detecting the presence of a user within said particular area, if said particular amount of time that has passed since said computer system activities were last processed is greater than a predetermined threshold period, thereby permitting said computer system activities to be initiated without manual user input.

2. The method of claim 1 further comprising the steps of:
    storing within said computer system, a predetermined list of authorized users;
    determining if said user within said particular area surrounding said computer system is an identified authorized user listed within said predetermined list of authorized users, in response to detecting the presence of a user within a particular area surrounding said computer system.

3. The method of claim 1 wherein the step of automatically initiating said computer system activities contained within said predetermined list of computer system activities, in response to detecting the presence of a user within said particular area, if said particular amount of time that has passed since said computer system activities were last processed is greater than a predetermined threshold period, thereby permitting said computer system activities to be initiated without manual user input, further comprises the step of:
    automatically initiating said computer system activities contained within said predetermined list of computer system activities, in response to detecting the presence of a user within said particular area, if said user within said particular area surrounding said computer system is an authorized user listed within said predetermined list of authorized users.

4. The method of claim 3 wherein the step of automatically initiating said computer system activities contained within said predetermined list of computer system activities, in response to detecting the presence of a user within said particular area, if said user within said particular area surrounding said computer system is an identified authorized user listed within said predetermined list of authorized users, further comprises the step of:
    automatically initiating a particular computer system activity contained within said predetermined list of computer system activities, in response to detecting the presence of a user within said particular area, if said user within said particular area surrounding said computer system is an authorized user listed within said predetermined list of authorized users.

5. The method of claim 4 wherein the step of storing within said computer system, a predetermined list of computer system activities to be initiated, further comprises the step of:
    storing within a memory location in a distributed computer network, said predetermined list of computer system activities to be initiated, such that said memory location may be accessed by any computer workstation within said distributed computer network.

6. The method of claim 5 wherein the step of detecting the presence of a user within a particular area surrounding said computer system, further comprises the step of:
    detecting the presence of a user within a particular area surrounding said computer system, wherein said computer system comprises a computer workstation within said distributed computer network.

7. The method of claim 6 further comprising the step of identifying said user as an authorized user.

8. A system for automatically initiating particular computer system activities within a computer system, said system comprising:
    means for storing within said computer system, a predetermined list of computer system activities to be initiated, said predetermined list of computer system activities including an initiation of a system self-test;
    means for detecting the presence of a user within a particular area surrounding said computer system;
    means for determining a particular amount of time that has passed since said computer system activities were last processed; and
    means for automatically powering up said computer system and for initiating said computer system activities contained within said predetermined list of computer system activities, in response to detecting the presence of a user within said particular area, if said particular amount of time that has passed since said computer system activities were last processed is greater than a predetermined threshold period, thereby permitting said computer system activities to be initiated without manual user input.

9. The system of claim 8 further comprising:
    means for storing within said computer system, a predetermined list of authorized users; and
    means for determining if said user within said particular area surrounding said computer system is an identified authorized user listed within said predetermined list of authorized users, in response to detecting the presence of a user within a particular area surrounding said computer system.

10. The system of claim 9 wherein said means for automatically initiating said computer system activities contained within said predetermined list of computer system activities, in response to detecting the presence of a user within said particular area, if said particular amount of time that has passed since said computer system activities were last processed is greater than a predetermined threshold period, thereby permitting said computer system activities to be initiated without manual user input, further comprises:

means for automatically initiating said computer system activities contained within said predetermined list of computer system activities, in response to detecting the presence of a user within said particular area, if said user within said particular area surrounding said computer system is an authorized user listed within said predetermined list of authorized users.

11. The system of claim 10 wherein said means for automatically initiating said computer system activities contained within said predetermined list of computer system activities, in response to detecting the presence of a user within said particular area, if said user within said particular area surrounding said computer system is an identified authorized user listed within said predetermined list of authorized users, further comprises:

means for automatically initiating a particular computer system activity contained within said predetermined list of computer system activities, in response to detecting the presence of a user within said particular area, if said user within said particular area surrounding said computer system is an authorized user listed within said predetermined list of authorized users.

12. The system of claim 11 wherein said means for detecting the presence of a user within a particular area surrounding said computer system, comprises a presence detector.

13. The system of claim 12 wherein said mean for storing within said computer system, a predetermined list of computer system activities to be initiated, further comprises:

means for storing within a memory location in a distributed computer network, said predetermined list of computer system activities to be initiated, such that said memory location may be accessed by any computer workstation within said distributed computer network.

14. The system of claim 13 wherein said computer system comprises a computer workstation within said distributed computer network.

15. The system of claim 14 wherein said presence detector comprises an infrared sensor.

16. The system of claim 15 further comprising means for identifying said user as an authorized user.

17. A program product residing in computer memory in a computer system for automatically initiating particular computer system activities, said program product comprising:

instruction means residing in a computer for storing within said computer system, a predetermined list of computer system activities to be initiated, said predetermined list of computer system activities including an initiation of a system self-test;

instruction means residing in a computer for detecting the presence of a user within a particular area surrounding said computer system;

instruction means residing in a computer for determining a particular amount of time that has passed since said computer system activities were last processed; and instruction means residing in a computer for automatically powering up said computer system and for initiating said computer system activities contained within said predetermined list of computer system activities, in response to detecting the presence of a user within said particular area, if said particular amount of time that has passed since said computer system activities were last processed is greater than apredetermined threshold period, thereby permitting said computer system activities to be initiated without manual user input.

18. The program product of claim 17 further comprising:

instruction means residing in a computer for storing within said computer system, a predetermined list of authorized users; and instruction means residing in a computer for determining if said user within said particular area surrounding said computer system is an identified authorized user listed within said predetermined list of authorized users, in response to detecting the presence of a user within a particular area surrounding said computer system.

19. The program product of claim 18 wherein said instruction means residing in a computer for automatically initiating said computer system activities contained within said predetermined list of computer system activities, in response to detecting the presence of a user within said particular area, if said particular amount of time that has passed since said computer system activities were last processed is greater than a predetermined threshold period, thereby permitting said computer system activities to be initiated without manual user input, further comprises:

instruction means residing in a computer for automatically initiating said computer system activities contained within said predetermined list of computer system activities, in response to detecting the presence of a user within said particular area, if said user within said particular area surrounding said computer system is an authorized user listed within said predetermined list of authorized users.

20. The program product of claim 19 wherein said instruction means residing in a computer for automatically initiating said computer system activities contained within said predetermined list of computer system activities, in response to detecting the presence of a user within said particular area, if said user within said particular area surrounding said computer system is an identified authorized user listed within said predetermined list of authorized users, further comprises:

instruction means residing in a computer for automatically initiating a particular computer system activity contained within said predetermined list of computer system activities, in response to detecting the presence of a user within said particular area, if said user within said particular area surrounding said computer system is an authorized user listed within said predetermined list of authorized users.

21. The program product of claim 20 wherein said instruction means residing in a computer for storing within said computer system, a predetermined list of computer system activities to be initiated, further comprises:

instruction means residing in a computer for storing within a memory location in a distributed computer network, said predetermined list of computer system activities to be initiated, such that said memory location may be accessed by any computer workstation within said distributed computer network.

22. The program product of claim 21 wherein said computer system comprises a computer workstation within said distributed computer network.

23. The program product of claim 22 wherein each of said instruction means further comprises signal bearing media.

24. The program product of claim 23 wherein said signal bearing media further comprises recordable media.

25. The program product of claim 24 wherein said signal bearing media further comprises transmission media.

26. A method in a pervasive computer system for automatically initiating particular computer system activities, said method comprising the steps of:

storing within said computer system, a predetermined list of computer system activities to be initiated, said predetermined list of computer system activities including an initiation of a system self-test;

detecting the presence of a user within a particular area surrounding said computer system; and automatically powering up said computer system and initiating said computer system activities contained within said predetermined list of computer system activities, in response to detecting the presence of a user within said particular area, thereby permitting said computer system activities to be initiated without manual user input.

27. The method of claim 26 further comprising the steps of:

storing within said computer system, a predetermined list of authorized users;

determining if said user within said particular area surrounding said computer system is an identified authorized user listed within said predetermined list of authorized users, in response to detecting the presence of a user within a particular area surrounding said computer system.

28. The method of claim 27 wherein the step of automatically initiating said computer system activities contained within said predetermined list of computer system activities, in response to detecting the presence of a user within said particular area, thereby permitting said computer system activities to be initiated without manual user input, further comprises the step of:

automatically initiating said computer system activities contained within said predetermined list of computer system activities, in response to detecting the presence of a user within said particular area, if said user within said particular area surrounding said computer system is an authorized user listed within said predetermined list of authorized users.

* * * * *